Oct. 22, 1929.  B. F. HARDESTY  1,732,599
LIQUID DISPENSING AND RECORDING APPARATUS
Filed April 6, 1925   9 Sheets-Sheet 1

INVENTOR
BEN FICKLIN HARDESTY
BY
Mason, Fenwick & Lawrence
ATTORNEYS

Oct. 22, 1929.  B. F. HARDESTY  1,732,599
LIQUID DISPENSING AND RECORDING APPARATUS
Filed April 6, 1925   9 Sheets-Sheet 5

INVENTOR
*BEN FICKLIN HARDESTY*
BY *Mason, Fenwick & Lawrence*
ATTORNEYS

Oct. 22, 1929.                B. F. HARDESTY                1,732,599
                    LIQUID DISPENSING AND RECORDING APPARATUS
                        Filed April 6, 1925        9 Sheets-Sheet 8

INVENTOR
*BEN FICKLIN HARDESTY*
BY
*Mason, Fenwick & Lawrence*
ATTORNEYS

Oct. 22, 1929.                    B. F. HARDESTY                    1,732,599
                      LIQUID DISPENSING AND RECORDING APPARATUS
                       Filed April 6, 1925          9 Sheets-Sheet 9

INVENTOR
BEN FICKLIN HARDESTY
BY
Mason, Fenwick & Lawrence
ATTORNEYS

Patented Oct. 22, 1929

1,732,599

UNITED STATES PATENT OFFICE

BEN FICKLIN HARDESTY, OF NEW YORK, N. Y., ASSIGNOR TO NATIONAL GAS REGISTER PUMP CO., OF NEW YORK, N. Y., A CORPORATION OF DELAWARE

LIQUID DISPENSING AND RECORDING APPARATUS

Application filed April 6, 1925. Serial No. 21,100.

My invention relates generally to apparatus for supplying liquids, particularly gasoline and motor fuels, to consumers, and for measuring, visibly indicating and recording the quantity of liquid delivered. For the sake of brevity and clearness my invention will be described with reference specifically to gasoline, although it is applicable to any other liquid as well.

The principal purpose and result of my invention is to provide an apparatus which, in its present embodiment, functions as follows:

(1) The attendant throws an electric switch, and an electrically actuated pump fills with gasoline an elevated container, containing a gasoline measuring float.

(2) The attendant then sets a visible index at a number on a visible scale corresponding to the number of gallons of gasoline to be delivered.

(3) The gasoline supply hose is then placed in the consumer's tank and a supply valve from the elevated container is then opened by the attendant to permit the gasoline to flow by gravity into the consumer's tank.

(4) When the predetermined quantity of gasoline has been delivered, the float in the container will, through interposed connections, cause the supply valve to be instantly and automatically closed, the setting index returned to zero on its scale, another index automatically moved to a number on the scale showing the exact number of gallons delivered, and said exact number of gallons, together with the prevailing price per gallon and the total cost, printed or impressed simultaneously on two tickets, one of which the attendant will hand to the consumer as a record and receipt and the other of which the attendant will retain as his own voucher.

(5) The said consumer's and attendant's tickets are detached from a rolled continuous strip of tickets, consecutively numbered, which are debited to the attendant, the balance of which remaining in the apparatus, will disclose to the visiting inspector the amount of gasoline that has been sold and the total receipts for which the attendant must account.

A further important object and effect of my invention is to provide a simple, durable and commercially practical apparatus which operates accurately, effectively and unfailingly as described.

In order that my invention may be fully understood, I shall first describe in detail the mode in which I at present prefer to carry the invention into effect and then point out its various novel features in the claims.

Reference is to be had to the accompanying drawings forming part of this specification in which the same parts are designated by like numbers in all the figures.

Figure 13, is a side view of a detail of the same hereinafter referred to.

In the drawings, 25 designates a hollow standard or casing in which, to prevent tampering, all parts of the apparatus are mounted and enclosed, excepting the electric switch controlling the main supply pump and the handles of the operating devices hereafter described.

For convenience of construction, I, in this example of my invention, make the casing 25 in several sections, a base section 26, a medial section 27 rigidly mounted on top of the base section by means of flanges united by bolts 28, and an upper container section 29.

The upper container section itself I, in this instance, make in four parts, to wit, a base plate 30, which is fitted on top of the medial section 27 and forms the floor of the gasoline container 31; a cylinder 32 of metal or glass which forms the wall of the container and is fitted on top of the base plate 30 with an intermediate packing to prevent leakage; a head plate 33, which is fitted on top of the cylinder 32 also with an intermediate leak proof packing, and a cover 34 which is fitted on top of the head plate.

The base plate 30, cylinder 32 and head plate 33, are all bound tightly together and to the lower casing by vertical bolt rods 35, passing through peripheral flanges on the medial section 27, and the base plate 30, and thence outside the cylinder 32, and through the head plate 33, so as to form an elevated leak proof container for the gasoline. The container cylinder 32 is made accurately and of uniform diameter throughout so that every unit of depth thereof will contain exactly the same quantity of gasoline.

Figures 23, 24:
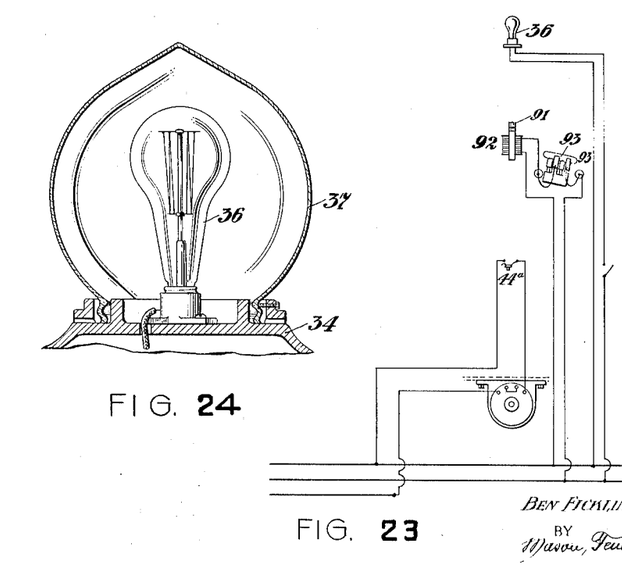
Figure 23 is a diagrammatic view showing the electric connection between the battery and source, the pump motor, the solenoid for actuating the valve and printing mechanism, and the automatically operated switch.
Figure 24 is a detail sectional elevation showing the electric lamp I at present prefer to employ on the top of the standard casing for night use.

For illuminating the apparatus and its environment at night as well as ornamenting it, I prefer, as shown in Figure 24 to mount an electric lamp 36 and ornamental globe 37 on top of the cover 34, and place the lamp in multiple circuit with the electric operating circuit of the apparatus, as indicated diagrammatically in Figure 23.

For filling the container 31 with gasoline, and replenishing it when consumed, I in this example of my invention prefer to mount on a bracket 38 within the base section 26 of the casing, an electric motor-driven gasoline pump 39, which may be of any approved description, and connect the same by a supply pipe 40, with a vertical supply pipe 41 rising through and from the floor of the container 31 to a point within the same near the container head plate 33. The gasoline pump 39 is also preferably connected by a pipe 42 with the main gasoline tank or other main source of supply.

From a point within the container 31, below the outlet of the supply pipe 41, descends an overflow or drain pipe 43, to and through the floor of the container, to a main supply tank (not shown) beneath the base section 26, so that as the container 31 is filled by the electric pump 39, the gasoline will rise to the mouth of the overflow pipe, and no more, the excess draining off through the overflow pipe 43 back into the main supply tank, which I do not think necessary to illustrate.

The container 31 and the height of the overflow pipe 43 is so proportioned and adjusted that the container when thus filled will hold a known quantity of gasoline, in this example, exactly five gallons.

A self opening switch 44ª (see Figure 2) is conveniently arranged in the medical section 27, in the pump circuit, so that when the container 31 is to be filled, the attendant simply throws and holds the switch until the container is filled, as hereafter indicated, and then releases the switch, so as to stop the pump and the filling operation.

It is evident in this connection that the filling of the container itself may be utilized automatically, by any well known or approved means, as by the measuring float 45 in the container, to open the pump circuit switch 44ª and stop the pump when the container is filled.

Properly to disperse the stream of gasoline issuing from the container supply pipe 41, and prevent it from beating down the float 45, I prefer to fix a circular spreader 46 to the container head plate 33, by or through the downwardly and outwardly curved rim of which, corresponding generally to that of the float 45, the supply pipe 41 rises, so that the stream of gasoline issuing therefrom will be deflected around the downwardly flaring rim of the spreader and thus fall between the edge of the float 45 and the wall of the container.

Figures 1, 2:
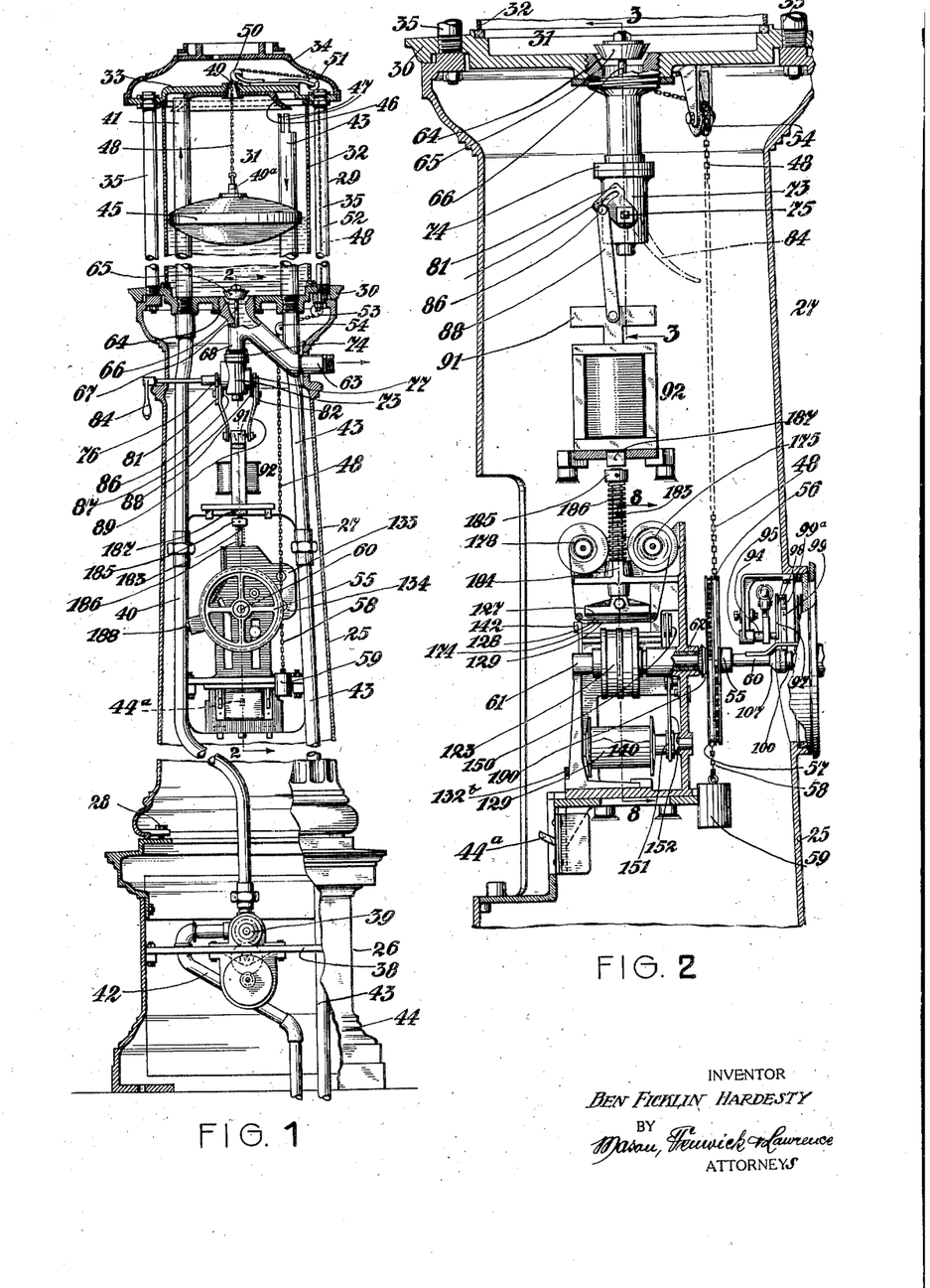
Figure 1 is a front sectional elevation, of a gasoline dispensing and recording apparatus embodying my invention.
Figure 2 is an enlarged cross sectional elevation of the middle part of the same on the line 2—2, Figure 1, showing the supply valve operating, quantity measuring and indicating, and ticket printing mechanisms.

The float 45 I make by preference in the form of a hollow oblate spheroid so as to float half submerged on the top of the gasoline, as shown in Figure 1, and in the present instance, it is made of aluminum, so as to have weight enough to actuate the delivery controlling and recording devices hereafter described, while being unaffected by impurities in the gasoline.

The float 45 as it rises with the level of the gasoline is guided by the supply and drain pipes and is prevented from swaying across the top of the overflow pipe 43 by, in this example, a guard consisting of vertical fingers 47 here cut for convenience out of the metal of the overflow pipe 43.

An actuating belt, in this instance a metal chain 48 of gasoline resisting material, is fastened to the float 45, and runs through an opening 49 in the head plate 33, which opening is closed by a stopper 49ª on the float when the float is raised over sheaves 50 and 51 mounted on top of the head plate.

The chain 48 then descends through a chain duct 52 extending outside the container vertically from and through the head plate 33 to and through the base plate 30, and thence over sheaves 53 and 54, mounted within the medial section 27 of the hollow casing, to a belt wheel 55.

Around one peripheral groove 56 of the wheel 55 the chain is wrapped for nearly the full circumference and its end fastened thereto. Around another peripheral groove 57 of the belt wheel 55 is wrapped another belt or chain 58 on the loose end of which is hung a weight 59 lighter than the float 45, which weight rotates the belt wheel 55 in one direction, when the gasoline and float rise in the container, but permit the float 45 to rotate the belt wheel 55 in the opposite direction, when the gasoline and float fall in the container.

The belt wheel 55 is fixed on a shaft 60 journaled transversely within the casing in bearings 61 and 62, and acts as a gasoline measuring and drive wheel for the delivery controlling and recording mechanism hereafter described.

For delivering the gasoline to the consumer from the container 31, I prefer in this instance to lead a discharge pipe 63 from the bottom of the container downwardly and outwardly laterally through the medial section 27 of the casing 25, to a threaded nozzle to which the usual hose is connected for delivering the gasoline into the car tank or other receptacle of the consumer.

In the discharge pipe 63, preferably where it enters the floor of the container, I form a valve seat 64, to which is fitted a vertically playing valve 65 fixed on the upper end of a valve stem 66, as shown in detail in Figures 2 to 5 inclusive.

The valve stem 66 works axially in a bearing 67 formed by preference in a boss 68 on the lower side of the discharge pipe 63, and the lower end of said valve stem is threaded and secured in the head of a vertically moving cam follower 69.

The cam follower 69 has a round head which is guided in the bore 70 of the boss 68, and the squared foot of the cam follower is guided in a detachable bearing 71 fitted in the end of the bore 70 and screwed to the end of the boss 68, for conveniently removing and replacing the valve and valve stem. Around the valve stem 66, in the bore 70 is placed a coiled spring 72 compressed between the upper end of said bore and the head of the follower 69 so as to press the valve on its seat but to permit it to be opened.

For opening the valve 65 by hand and allowing the gasoline to flow out of the discharge pipe 63, but not leak out around the valve stem and follower, I, in the present example, form a thread on the exterior of the rigid boss 68, and screw thereon a bearing cup 73, secured by a lock nut 74. Transversely in the bearing cup 73 is mounted a rock shaft 75, whose respective ends are sealed against leakage by stuffing box bearings 76 and 77, and on the middle of the rock shaft within the cup 73 and beneath the follower 69 is fixed a cam 78 having a rounded side 79 to engage and raise the follower 69, thus opening the valve, and a squared end 80 to hold or lock the follower 69 raised and the valve open until the cam is retracted.

One end of the cam shaft 75 is extended laterally outside the casing (as best shown in Figure 1) and has a handle 84 fixed thereon for rocking it and thus opening the valve by hand.

Figures 3, 4, 5, 6, 7:
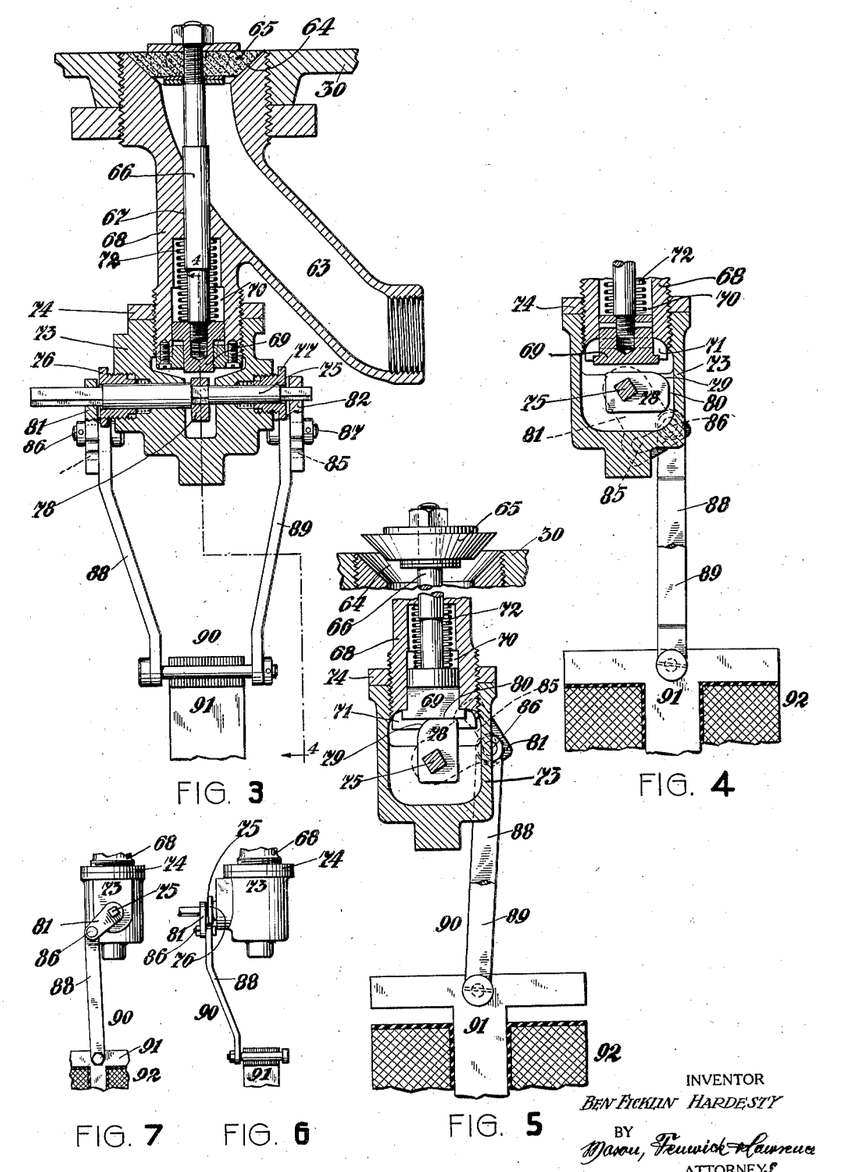
Figure 3 is a still further enlarged sectional elevation on the line 3—3, Figure 2, showing part of the supply valve operating mechanism.
Figure 4 is a detail cross sectional elevation of a part of the same on the line 4—4, Figure 3, the supply valve being closed.
Figure 5 is a view similar to Figure 4, showing the supply valve opened.
Figures 6, and 7 are reduced detail views of a modification showing the valve operating connections in front and side elevation respectively.

For retracting or tripping the cam electrically and thus permitting the spring 72 to close the valve, I prefer to fix two arms 81 and 82 on the respective ends of the cam shaft 75 which arms are in the laterally extended position indicated in Figure 5, when the cam follower and valve are raised, and are lowered to the position indicated in Figure 4, when the valve follower and valve are lowered. In the ends of the tripping arms 81 and 82, are formed axially concentric slots 85, in which ride and are pivoted crank pins 86 and 87, fixed on the ends of the respective branches 88 and 89 of a connecting link 90 which is pivoted to the upper end of the armature 91 of a solenoid 92.

In Figures 6 and 7 I show a modified form of bearing cup 73′ secured by a lock nut 74′. In the bearing cup 73′ all the parts are similar to the bearing cup shown in the other figures of the drawing with the exception of the arm 81'. Arm 81' in this case is not provided with an axially concentric slot but is pivoted directly to branch 88'. Also I prefer in his modified form to use but one branch in the connecting link 90, which branch is denoted by 88'.

The solenoid 92 is in this embodiment arranged in multiple circuit, like the motor pump circuit, as indicated in Figure 23, but in series with an automatic measuring switch 93 hereinafter described, so that when the desired quantity of gasoline is delivered from the container, the switch will be automatically closed by the action of the gasoline measuring float 45 and drive wheel 55, the solenoid 92 vitalized, the armature 91 and link 90 pulled downward, the cam 78 tripped, the discharge valve closed by its spring, and the delivery of gasoline stopped.

Figures 14, 15:
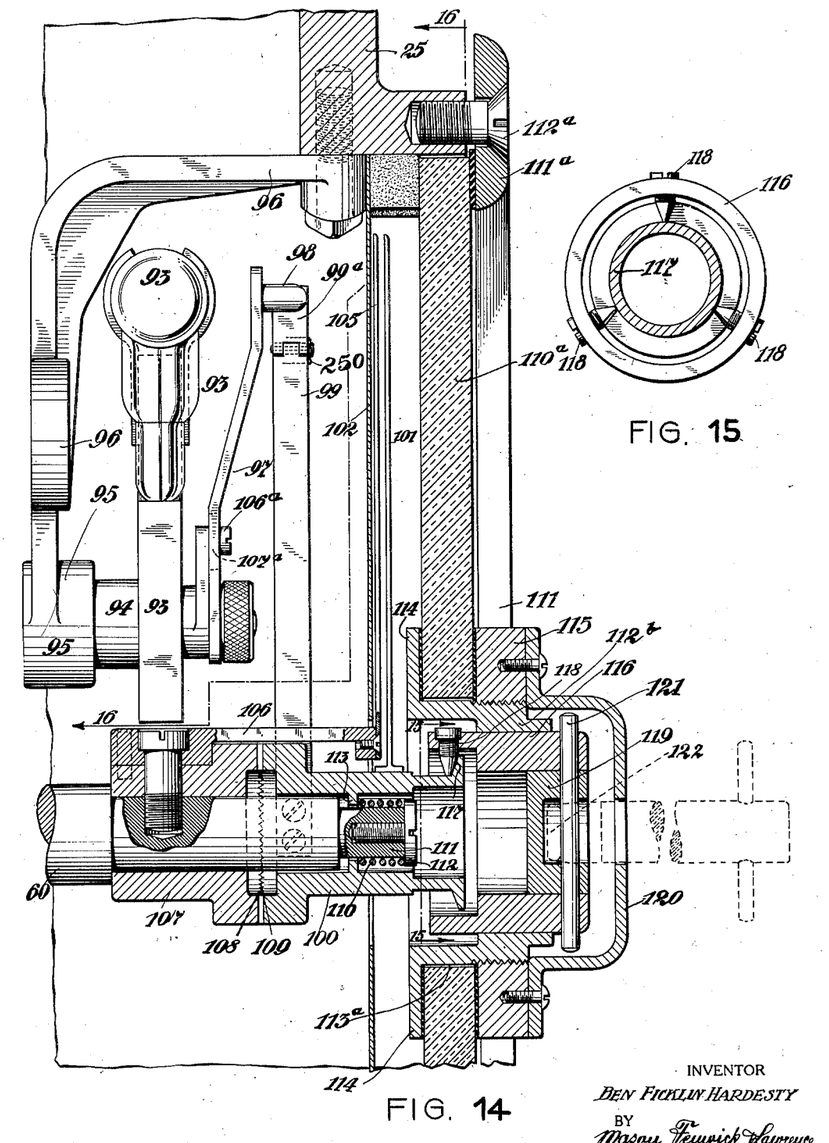
Figure 14, is a cross sectional elevation showing the setting and indicating mechanism of the apparatus.
Figure 15 is a front sectional elevation of a part of the same on the line 15—15, Figure 14.
Figure 16:
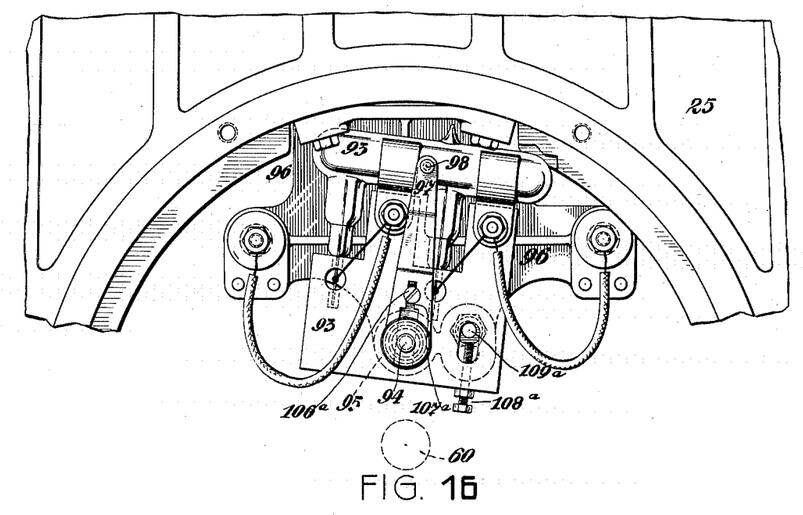
Figure 16 is a front elevation showing the closed mercury switch in position to be thrown by the setting device when the desired quantity of gasoline is delivered, so as to cause the gasoline supply valve to be closed electrically and the quantity, price and cost tickets to be printed and presented.
Figure 17:
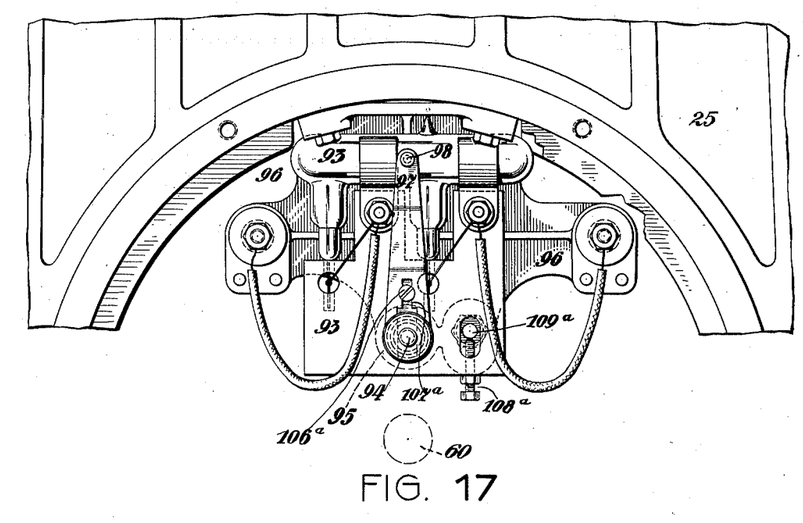
Figure 17 is a similar front elevation showing the mercury switch after being thus thrown to close the electric actuating circuit.

To avoid the fire hazard and comply with the laws, I, in this instance, prefer to employ as the automatic switch 93, a closed mercury switch of ordinary character, best shown in Figures 14, 16 and 17, and to mount it by means of a pivot pin 94 on the bearing 95 of a rigid bracket 96 fixed to and projecting downward and inward from the inside of the casing 27 to a point above and in proximity to the main measuring shaft 60.

The arrangement is such that when the switch is in the position shown in Figure 16, tilted to the right, the switch circuit will be open and the solenoid 92 devitalized, and when the switch is rocked on its pivot to the position shown in Figure 17, the switch circuit will be closed, the solenoid energized and the valve 65 tripped and closed as before described.

To cause the switch 93 and valve 65 to be automatically closed the instant the desired quantity of gasoline is delivered, I in this case prefer to connect rigidly to the pivot pin 94 a radial arm 97 having a projection 98 in the path of a radial tripping arm 99 fixed to a clutch sleeve 100 mounted to turn loosely on the measuring shaft 60.

The tripping arm 99 has a tripping finger 99ª pivoted thereto and yieldingly held in alinement with said arm 99 by means of spring 250. This arrangement and construction permits movement of the tripping finger in one direction only, relative to the arm 99. This permits the switch arm and switch to return by gravity to the right and break the circuit immediately after closing the circuit and actuating the valve as described due to the part 99ª snapping past the part 98.

On said clutch sleeve 100 is also fixed a pointer or index 101 which, as best shown in Figures 14, 18, 19, 20 and 21, is arranged to swing over and around a dial 102, bearing a circular scale of numbers 103 indicating in this instance gallons of gasoline, and extending clockwise from "1" up around the dial.

On the dial 102 is also another circular scale of, in this instance, more conspicuous, numbers 104, extending contra-clockwise from "1" up around the dial. With the numbers 104, is arranged to register another pointer or index 105, fixed through a connecting arm 106 to a clutch sleeve 107 which is fixed on the measuring shaft 60. The clutch sleeves 100 and 107 have corresponding clutch teeth 108 and 109 around their adjacent ends which are held normally in engagement by means of a spring 110 coiled around a hub 111 on the end of the shaft 60. The spring is confined under pressure between a screw shoulder 112 on the end of the hub 111, and a collar 113 fixed on the inside of the sleeve 100.

Figure 18:
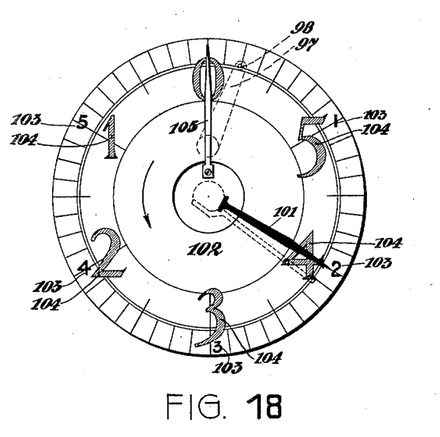
Figures 18, 19, 20, and 21, show different stages of the quantity indicating dial, the setting hand for measuring off and indicating thereon the number of gallons of gasoline to be delivered, and the indicating hand for showing the number delivered, as will be hereafter described.

With this construction and arrangement, when the customer has stated the number of gallons of gasoline he desires, for example 2, the attendant will pull the loose clutch sleeve 100 out of engagement with the clutch sleeve 107 fast on the shaft 60, and then turn the loose clutch sleeve 100 and its attached index 101 to the right to the small dark number "2" as indicated in Figure 18. The attendant will then release his hold on the clutch sleeve 100, which will then be thrown by the spring 110 into engagement with the fast clutch sleeve 107, and thus with the shaft 60. The shaft 60 meanwhile is so adjusted with relation to its actuating float 45 and its fast index 105, that when the container 31 is full the index 105 will point to "0" on the large number scale 104, as shown in Figure 18.

Figure 19:
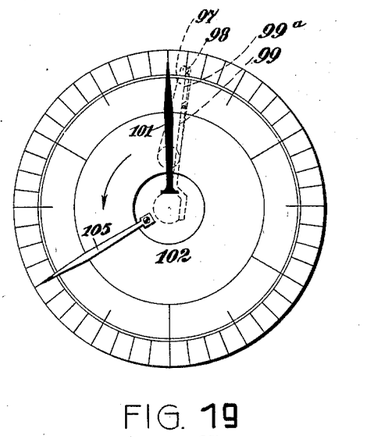

The attendant will then open the gasoline discharge valve 65 by the handle 84 as previously described, the gasoline and float 45 will fall, and the measuring shaft 60 will turn to the left or contra-clockwise until the setting index 101 returns to "0" on the scale, and the pointing index 105 swings to the left to "2" on the scale as shown in Figure 19. Then the tripping arm 99, moving with the index 101, will instantly throw the automatic switch 93, close its circuit and the valve operated thereby and stop the gasoline delivery as previously described.

The adjustment and relation of parts is such that when the setting index 101 returns to "0" and the registering index swings to "2," exactly two gallons of gasoline, in this example, will be found to have been delivered.

Figure 20:
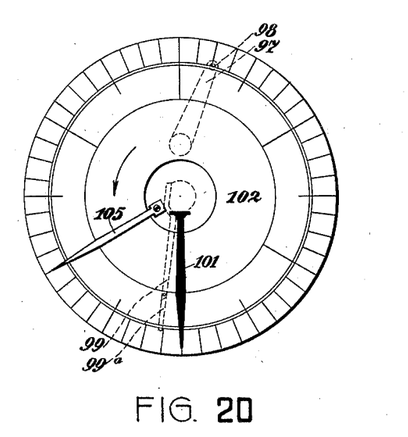
Figure 21:
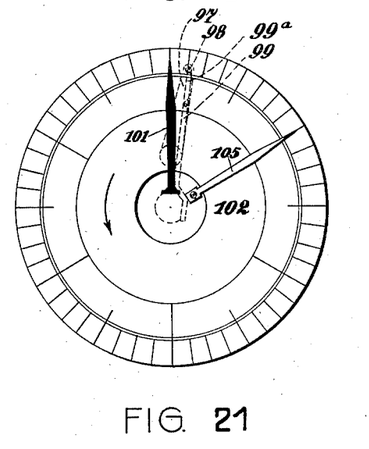

If the same customer should then order three additional gallons of gasoline, the attendant will loose the index 101, as described, at "0," turn it to the right to "3" on the scale as indicated in Figure 20, and then permit it to engage the shaft 60 and index 105. The delivery valve then being opened, the float will fall until the setting index 101 returns to "0," and the registering index 105 moves on to 5, (the total of two and three gallons as shown in Figure 21) when the gasoline will be cut off as before described, and exactly three gallons more will be found to have been delivered.

For more accurately adjusting the relation of the switch 93 to the tripping or measuring arm 99, so that the gasoline will be cut off at exactly the right instant, regardless of variations in different switches or the other parts, I prefer in this instance to make the switch arm 97 adjustable radially on the switch 93 by fastening it to the switch plate by a set screw 106ª passing through a slot 107ª in the arm 97.

The arm 97 can thus be adjusted radially with respect to the switch, and as the centres of motion of the switch arm 97 and its tripping arm 99 are separated, the moment of actuating contact between the tripping arm and the switch arm can be adjusted with very great accuracy.

Another set screw 108ª in the switch plate is preferably arranged to meet a fixed projection 109ª of the bracket 96 playing in a slot in the switch and adjustably limit the closing motion of the switch.

For pulling the loose clutch sleeve 100 out of engagement with the fast clutch sleeve 107, and setting the loose index 101, and switch tripping arm 99 as described, at the same time preventing an ill-disposed attendant from keeping the cut off and recording mechanism from operating while the gasoline valve is open, I prefer to use the following means.

An opening covered by a glass plate 110ª, held in place by a detachable rim 111ª and screws 112ª, is preferably provided in the front of the casing 25 to render the dial 102, scales and indexes 101 and 105 visible to the attendant and customer.

In an opening 113ª in the glass plate 110ª, is fixed a circular bearing 112ᵇ, held in place therein by a peripheral flange 114 bearing against the inside of the glass, and a collar 115 screwed on a threaded portion of the bearing 112ᵇ outside and against the glass. In the bearing 112ᵇ is mounted to turn as well as play axially a friction clutch cap 116 which encloses and surrounds the outer end of the clutch sleeve 100, and the latter is formed with a sloping annular friction clutch shoulder 117 facing inward and preferably milled or roughened to increase the friction. Through the inner end of the friction clutch cap 116 are screwed radially adjustable friction studs 118 (see Figure 15) having tapering inner friction ends to correspond with and engage the sloping friction shoulder 117 of the sleeve 100. In the outer end of the friction clutch cap 116 is secured a key block 119 having an outer cover 120, by means of a pin 121 passed transversely through the cap 116 and key block 119 and across the cover 120 the pin 121 being spaced both from the side and bottom of the recess 120, to admit an L or hook-like key 122 (indicated in dotted lines) to be carried by the attendant. The arrangement and adjustment is such that the ends of the cross pin 121 will meet the outer end of the abutment for the spring end 112, and prevent the cap 116 from being pushed against the sleeve to hold the valve closing and recording mechanism from functioning. The grip between the clutch studs 118 and clutch shoulder 117 however will be sufficient to enable the attendant to pull out with his key 122 the cap 116 and sleeve 100, disengage the loose sleeve 100 from the fast sleeve 107, and set the index 101 for delivery as before described.

For automatically effecting the automatic printing and presentation of a ticket or tickets showing the quantity of gasoline delivered as described, its price per gallon and its total cost, I at present prefer to utilize the measuring shaft 60 to feed the tickets to the printing device and the solenoid to do the printing or impressing thereon, by the following casing enclosed mechanism, which is best shown in Figures 2, 8, 9, 10, 11, 12, and 13:

On the measuring shaft 60, I fix a removable ticket printing type drum or wheel 123 having three peripheral sets 124, 125, and 126, of type thereon.

Figure 22:
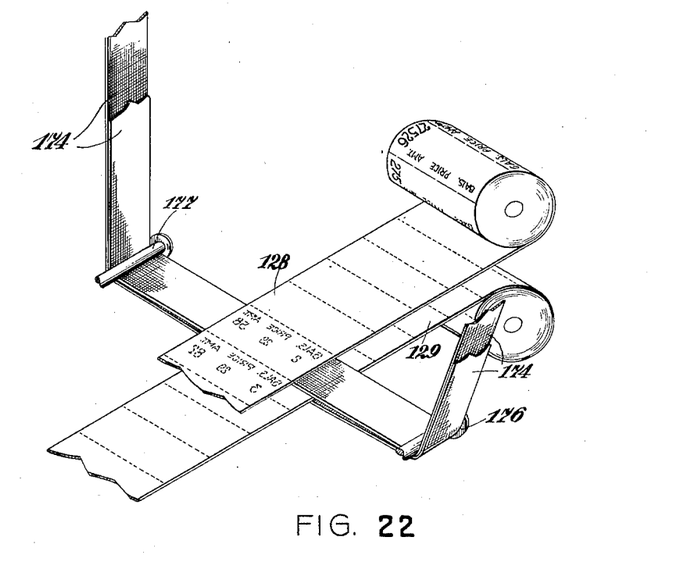
Figure 22 shows the continuous strips of tickets to be printed to record thereon quantity, price and cost as used in this embodiment of my invention.

As indicated in the reverse on the tickets shown in Figure 22, the type 124 form a circular series of fractional numbers, in this instance, running progressively from "⅛" by eighths to "5", to print on the ticket the exact number of gallons delivered as above described; the type 125 all form the same number, in this example "29", to be printed on the ticket to show the price abreast the printed number of gallons, and the type 126 form a progressive series of numbers, in this instance from ".04" to "1.45", to be printed alongside the printed number of gallons and price and show the total cost of the purchase.

The type wheel 123 is so proportioned and adjusted on the shaft 60 that when the gasoline container 31 is full and the registering index 105 is at zero, the quantity number "0", and its corresponding price and cost numbers of the type wheel will be beneath the printing platen 127, and when the registering index 105 turns to "2", for example, the quantity number "2" with its corresponding price and cost numbers will be beneath the platen 127.

The customer's original and attendant's duplicate tickets 128 and 129, I prefer to make in like, long, continuous strips and to number consecutively, as shown in Figure 22, and the attendant is furnished with a number of these strips, the tickets of the total number of strips being likewise numbered in regular order, so that the inspector in his rounds of the filling stations, can check up on each attendant by comparing the receipts with the number of tickets issued and remaining as hereinafter described.

The printing drum wheel 123 is by preference locked removably as above stated on the main shaft 60, by means of a cross pin 130 through the shaft, entering a transverse slot 131 in the hub of the type wheel and a removable standard 132 carrying the shaft bearing 61, the standard 132 being held in place by a keeper 132$^a$ and set screw 132$^b$, the purpose being to provide for using a number of different type wheels having different price and cost type thereon, and for mounting on the shaft the particular type wheel bearing the price and cost type corresponding to the prevailing market price of gasoline.

To equip the apparatus for printing and representing the customer's ticket and for retaining printed copies of all the tickets thus issued, I prefer at present to employ the following mechanism, enclosed within the casing 25:

In standard bearings 133 and 134 fixed with respect to the bearings of the main shaft 60 are journaled ticket strip supply reels 135 and 136, axially parallel to the type wheel. On the upper reel 135 is initially wound in one direction the customer's ticket strip 128 and on the lower reel 136 is initially wound in the opposite direction the attendant's duplicate ticket strip 129; the two reels being preferably arranged abreast of each other and so that the two ticket strips will be fed from the supply reels superposed and with individual original and duplicate tickets of the same number exactly superposed and faced downward.

The superposed ticket strips 128 and 129 are in this instance led from the supply reels to and between axially parallel feed rolls 137 and 138, preferably covered with rubber or equivalent yielding traction material, and thence between the printing platen 127 and the type wheel 123, the printed original ticket strip 128 being thence, in this instance, led out of the casing through an outlet 139, for presentation to the customer and the duplicate printed ticket strip 129 being led around the type wheel 123 to a take-up reel 140, on which it is wound up and preserved as a record for examination and comparison by the inspector.

Figure 10:
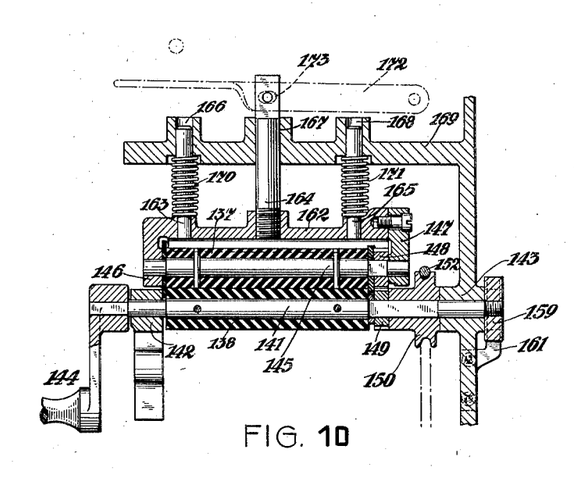
Figure 10 is a detail cross sectional elevation of the same on the line 10—10, Figure 8.

The lower feed roll 138 is fixed on a shaft 141, best shown in Figure 10, journaled in end bearings 142 and 143 fixed with respect to the main shaft 60, and shaft 141 has at one end a crank handle 144 for rotating it.

Figure 8:
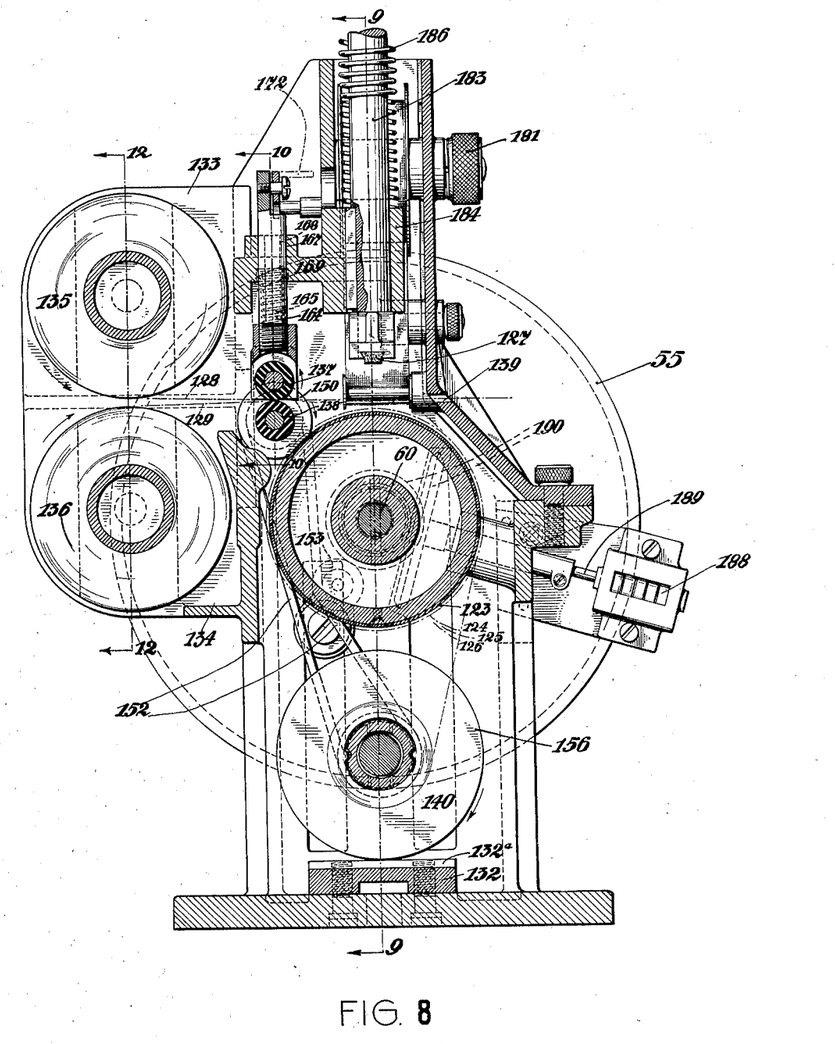
Figure 8 is an enlarged rear sectional elevation on the line 8—8, Figure 2, showing the ticket printing and delivering mechanism.

The upper feed roll 137 is fixed on a shaft 145, journaled in end bearings 146 and 147, and geared to the feed roll shaft 141 by spur gears 148 and 149, so that by turning the handle 144, as indicated in Figure 8, the superposed ticket strips 128 and 129 are drawn from their respective reels and fed to the printing devices and beyond as previously described.

On the feed roll shaft 141 is also fixed a belt wheel 150, which is connected to a belt wheel 151 fixed to the ticket take-up reel 140, by means of a belt 152 guided over a loose belt wheel 153, so that the duplicate ticket strip 129 will be wound up in the take-up reel 140 as fast as it is printed.

Figure 9:
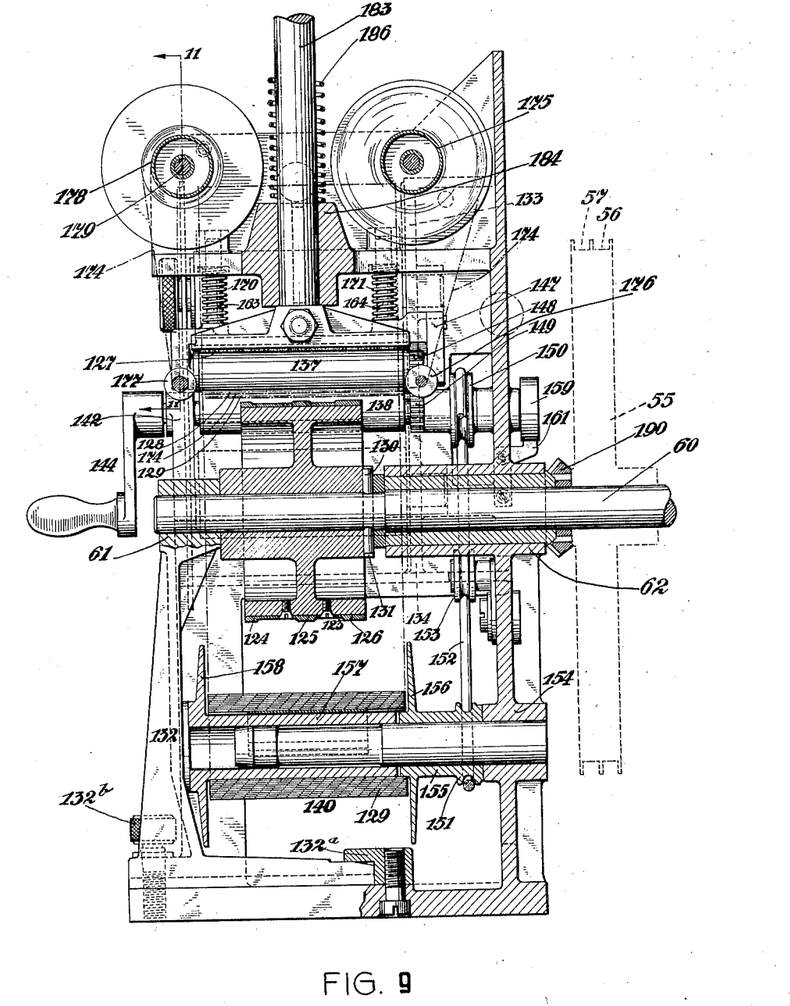
Figure 9 is a cross sectional elevation of the same on the line 9—9, Figure 8.

I prefer to make the take-up reel 140, as best shown in Figure 9, in two separable parts rotating freely on an axle bearing 154 fixed to the frame.

One part 155 of the reel carries one flange 156 and the belt wheel 151 and the other part 157 carries the other flange 158 and is removable from and replaceable on the axle bearing, for removing the printed duplicate ticket strip and substituting a new ticket strip therefor. The end of each original and duplicate ticket strip is provided with a blank extension for leading it to the outlet 139 and to the take-up reel 140 respectively, and for positioning the first pair of original and duplicate tickets accurately over the printing wheel.

The arrangement and adjustment in this instance is such that the particular type positioned by the setting index, when delivery is completed as before described, will print on the duplicate tickets below the words "Gals.", "Price" and "Cost" respectively, the correct number of gallons delivered, the price and the total cost thereof.

Figure 13:
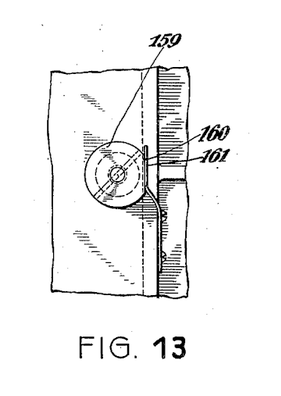

To insure that only and exactly one ticket is fed to the printing wheel 123 at a time, I prefer to fix on the end of the shaft 141 of the handled feed roll 138, a stopping and holding disk 159, best shown in Figures 10 and 13, having a flat bearing 160 on its edge, against which presses a flat spring 161 fixed to the roll bearing, so as to stop and hold the feed rolls and automatically notify the attendant to stop when each superposed pair of tickets is moved forward as described.

Conveniently to provide for the initial introduction of the ticket strips between the feed rolls 137 and 138, I prefer to fix the bearings 146 and 147 of the upper feed roll 137, on a vertically movable carrier 162, fixed on the lower ends of guide studs 163, 164, and 165, which are mounted to slide in vertical bearings 166, 167 and 168 of a fixed bracket 169. Between the bracket 169 and the carrier 162, on the guide studs 163 and 165, are placed compressed coiled springs 170 and 171 which thus hold the upper feed roll 137 yieldingly against the lower feed roll 138, but permit the upper feed roll 137 to be raised and separated from the lower feed roll for introducing the ticket strips therebetween. For thus raising the upper feed roll I in this instance use a handle lever 172 which, as indicated in dotted lines in Figure 10, is pivoted at one end to a fixed point, and is connected medially by a pin and slot 173 to the upper end of the middle guide stud 164 of the feed roll.

Figure 11:
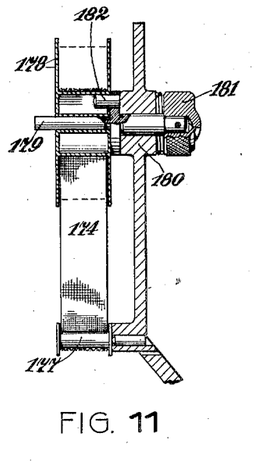
Figure 11 is a front sectional elevation of a part of the same on the line 11—11, Figure 9.
Figure 12:
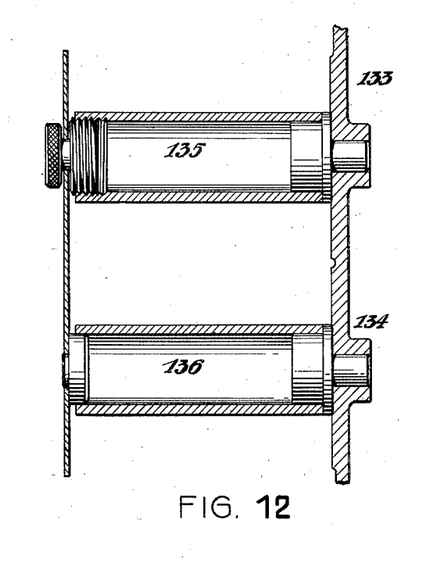
Figure 12 is a cross sectional elevation of a part of the same on the line 12—12, Figure 8.

For causing the superposed pair of tickets, thus fed over the positioned type wheel, to be printed or impressed by the type thus set as the delivery is completed, I prefer to use, in the present example of my invention, two superposed inking or printing ribbons 174, indicated by a single dotted line in Figure 9, which are led from a ribbon reel 175 suitably journaled in the frame, to a loose guide wheel 176 and thence between the type wheel 123 and the printing platen 127, transversely across the superposed ticket strips 128 and 129. One printing ribbon passes between the lower ticket strip and the type wheel so as to print on the down turned face of the lower or duplicate ticket and the other printing ribbon passes between the superposed ticket strips so as to print on the down turned face of the upper or original ticket. From the printing wheel the superposed printing ribbons are led to and under a loose guide wheel 177 and to another ribbon reel 178, the two ribbon reels 175 and 178 being preferably mounted removably as indicated in Figure 11, on shafts 179, journaled in suitable bearings 180 on the frame. The shafts 179 are preferably provided with milled heads 181 for turning them, and pins 182 for locking the ribbon reels thereon, so that the printing ribbons can be shifted as desired to present fresh inking surfaces to the printing wheel.

For depressing the printing platen 127 and printing the tickets at the instant the valve is closed and the delivery is completed, I prefer to fix the platen 127 on the lower end of a vertically movable shank 183, which is mounted to slide vertically in a guide bearing 184 fixed to the frame, and has a head 185 on its upper end (shown in Figures 1 and 2). Between the head and bearing is interposed a compressed coil spring 186 by which the platen 127 is normally held raised from the printing wheel 123.

The head 185 of the platen shank is arranged axially in line with and in striking range of the foot 187 of the solenoid armature 91, so that when the solenoid is vitalized, the valve closed, and delivery completed as above described, the foot 187 of the armature will depress the platen against the printing wheel and interposed tickets and printing ribbons, and thus print on the tickets the correct number of gallons delivered, the correct price and the correct total cost as above described.

The attendant will then turn the feeding rolls exactly one revolution as described, which will deliver the original correctly printed ticket through the outlet 139, to be handed to the customer, and will at the same time wind up one duplicate ticket on the take up reel 140 as a record, and present the next superposed pair of tickets to the printing device to be printed correctly as described when the next customer is served.

The original printed ticket thus delivered at the outlet 139, will be torn off its strip by the attendant and delivered to the customer as a correct receipt and record of the transaction.

As a check on the attendant, I prefer to employ an ordinary automatic counter 188 (as shown in Figures 8 and 9) geared by a shaft 189 and bevel gearing 190 to the shaft 60, so as to register when the shaft 60 is rotated in unison with the gasoline delivery, but not to register when the shaft 60 is reversed in filling. The automatic counter will thus show the total amount of gasoline delivered for comparison with the duplicate tickets.

I have thus shown and described one specific embodiment and application of my invention as an entirety. But it is evident that the specific means thus described may be greatly varied as a whole or in part without departing from the boundaries of my invention, for a definition of the various features of which reference is to be had to the following claims.

For example it is evident, broadly speaking, that the float and all the parts moving in harmony therewith measure the delivery of the liquid, and may be substituted by other suitable measuring means; that the printing wheel and platen impress the ticket as a record, and may be substituted by other suitable impressing or recording devices whether they print, indent, perforate or otherwise mark the ticket or record; that one printing ribbon may be used instead of two by simply doubling and feeding the ribbon upon itself to make two plies of a single ribbon, and that both tickets may be presented at the outlet for detachment instead of winding up the printed duplicate within the casing.

I claim as my invention:—

1. A liquid dispensing and measuring apparatus comprising liquid delivering and measuring means, a delivery control, a tripper for stopping the delivery, a quantity indicator moving in harmony with the tripper, means for engaging the tripper and quantity indicator with, and disengaging them from the quantity measuring means, and means for starting the delivery whereby when the quantity indicator moves the desired distance, the tripper moving therewith will automatically stop the delivery.

2. Liquid dispensing and indicating means comprising liquid delivering and measuring means, a delivery control, a tripper for stopping the delivery, a scale of units of quantity progressing in one direction, another scale of the same units progressing in the opposite direction, an index moving in harmony with the measuring means over one scale, another index movable over the opposite scale and moving in harmony with the tripper, and means for disengaging the second index from the measuring means, moving it to the desired unit and there engaging it with the measuring means, so that it will move reversely with the measuring means back to zero on its scale and the tripper therewith will then stop the delivery, and the other index will at the same time move to the desired unit on the opposite scale.

3. In liquid measuring and delivering apparatus, a liquid container, a main supply pipe leading into the upper part thereof, a liquid measuring float within the container and a liquid spreader at the top of the float above which spreader the supply pipe opens, the spreader corresponding in outline generally to the float so as to shower the liquid around the edge of the float.

4. In liquid delivering apparatus, a hollow standard casing, a container thereon, a delivery pipe leading from the bottom of the container laterally to the outside of the casing, a valve in the delivery pipe, a valve stem extending through the delivery pipe and movable axially therein, a cam shaft extending laterally through the casing, and a cam on said cam shaft to move the valve stem.

5. In liquid delivery apparatus, a standard casing, a container thereon, a delivery pipe leading from the container, a valve in the delivery pipe, a valve stem, a spring to close the valve, a cam follower, a cam to open the valve and lock it open, and a cam shaft to unlock the cam, and permit the spring to close the valve.

6. In liquid delivering apparatus, a standard casing, a container thereon, a delivery pipe leading from the container, a valve in the delivery pipe, a valve stem, a spring to close the valve, a cam to open the valve and lock it open, a cam shaft having an arm, an electric solenoid, and a link connecting the cam shaft arm and the solenoid armature so that the solenoid when energized will rock the cam shaft and permit the spring to close the valve.

7. In liquid dispensing apparatus, a casing, liquid measuring means including a shaft, a switch, a projection on the switch, a sleeve, a clutch for engaging the sleeve to and disengaging it from the shaft, a switch tripper and index on the sleeve, and a scale with which the index registers, a liquid delivery valve and valve closing means operated by the tripper automatically to stop the delivery when the index reaches a predetermined point on the scale.

8. In liquid dispensing apparatus, a casing, liquid measuring means including a shaft, a switch, a projection on the switch, a sleeve, a clutch for engaging the sleeve to and disengaging it from the shaft, a switch tripper and index on the sleeve, an index on the shaft, and two oppositely progressing scales with which the respective indexes register, a liquid delivery valve and valve closing means operated by the tripper automatically to stop the delivery when the indexes reach predetermined points on their respective scales.

9. In liquid dispensing apparatus, a casing, liquid measuring means including a measuring shaft, a measuring sleeve axially and peripherally movable with respect to the shaft, an index and tripper moving in harmony with said measuring sleeve, a delivery valve and means operated by the tripper to close said valve when the index reaches a predetermined point, a shaft and sleeve clutch, a sleeve setting cap enclosing and movable axially and peripherally with respect to the sleeve, and a friction pull clutch between the sleeve and its setting cap whereby the sleeve can be pulled and rotated on the shaft by the cap, but cannot be pushed thereby and used to rotate the shaft.

10. In liquid dispensing apparatus, a casing, liquid measuring means, including a measuring shaft, a measuring sleeve axially and peripherally movable with respect to the shaft, an index and tripper moving in harmony with the measuring sleeve, a delivery valve and valve closing means operated by the tripper to close the valve when the index reaches a predetermined point, a shaft and sleeve clutch, a sleeve setting cap enclosing and movable axially and peripherally with respect to the sleeve, and a friction pull clutch between the cap and sleeve, the cap being formed with an outside recess and pin crossing the same to receive a pulling and turning key.

11. A fluid dispensing and measuring apparatus comprising a tank, fluid delivery means for said tank, an outlet valve in said tank, manually controlled means for opening said valve, float operated means for closing said valve when a predetermined quantity of fluid has been dispensed, and surge preventing means within said tank to prevent undue movement of the float operated means by fluid delivered to said tank.

12. A fluid dispensing and measuring apparatus comprising a tank, means to deliver fluid to said tank, an outlet valve for said tank, manually controlled means for opening the valve, electrically controlled means to close said valve, a rockable switch for controlling said last named means, means to indicate the amount of fluid in said tank, means to indicate the amount of fluid to be delivered from said tank, and movable with said first named indicating means, means carried by said last named indicating means having a portion thereof disposed within the path of the rockable switch, and means in said tank for actuating the second named indicating means and thereby the switch to close the valve when a predetermined amount of fluid has been delivered from said tank.

13. A fluid dispensing and measuring apparatus comprising a tank, means to deliver fluid to said tank, a valve in said tank, manually controlled means for opening said valve, electrically controlled means to close said valve, a switch for controlling the last named means, means to indicate the amount of fluid in the tank, means to indicate the amount of fluid delivered from said tank and movable with the first named indicating means, switch actuating means carried by the fluid delivery indicating means, and fluid actuated means for controlling said last named indicator and thereby the switch to close the valve when a predetermined amount of fluid has been delivered from the tank.

14. A liquid dispensing and measuring apparatus comprising a motor actuated pump, a fluid delivery tank, having an inlet port and an overflow port, a fluid deflecting means supported by said tank and having a portion thereof disposed below said inlet, an outlet valve, and means for automatically closing said valve when a predetermined amount of fluid has been delivered from said tank, said deflecting means being positioned so as to prevent undue movement of the valve closing means.

15. A fluid delivery and measuring apparatus comprising a tank, a motor actuated pump for supplying fluid to said tank, a manually operable valve in said tank to permit the flow of fluid therefrom when the same is opened, electrically actuated means connected to said valve, switch mechanism in circuit with said valve, actuating means and means located within said tank for opening the valve actuating means circuit to close the valve when a predetermined amount of fluid has been delivered.

16. A fluid dispensing and measuring apparatus comprising a tank, means for delivering fluid to said tank, a manually operable valve disposed within said tank to permit the egress of fluid therefrom when the valve is opened, a solenoid connected to said valve, a rockable switch, indicating means having a portion disposed within the path of said rockable switch, and fluid actuated means for operating the indicating means and thereby the switch to energize said solenoid whereby to automatically close said valve when a predetermined amount of fluid has been delivered from said tank.

17. A fluid dispensing apparatus comprising a tank, a fluid deflector within said tank, a fluid inlet line for said tank having its upper end disposed above said deflector, an overflow pipe beneath said deflector, an outlet valve in said tank and fluid actuated means to automatically close said valve when a predetermined amount of fluid has been delivered from said tank.

18. A fluid dispensing and measuring apparatus comprising a delivery tank, means for supplying fluid to said tank, an outlet valve, electrically actuated means to close said outlet valve, a rockable switch in circuit with said valve actuating means, an indicator having a part adapted to contact with said rockable switch to actuate the latter, and fluid actuated means adapted to move said indicating means and thereby to rock said switch to close the valve when a predetermined amount of fluid has been delivered from said tank.

19. A fluid dispensing and measuring apparatus comprising a delivery tank having an outlet, controlling means for said outlet, movable means to indicate the amount of fluid in the tank, settable means for indicating the amount of fluid to be delivered, means actuated by the settable means for operating said outlet controlling means upon delivery of the amount of fluid for which the settable means has been set, and manually controlled means for connecting the two indicating means for simultaneous movement and being releasable to enable the settable means to be set independent of the first named indicating means.

20. A fluid dispensing and measuring apparatus, comprising a delivery tank having a valved controlled outlet, means to indicate the amount of fluid in the tank, means to indicate the amount of fluid to be dispensed and movable with the first named indicator, manually operable means to open the outlet and automatic means connected to the last named indicator to close the outlet when a predetermined amount of fluid has been dispensed.

In testimony whereof I affix my signature.

BEN FICKLIN HARDESTY.